(12) United States Patent
Kaji et al.

(10) Patent No.: US 6,795,769 B2
(45) Date of Patent: Sep. 21, 2004

(54) NAVIGATION APPARATUS AND STORAGE MEDIUM THEREFOR

(75) Inventors: Takanori Kaji, Okazaki (JP); Noboru Ishibashi, Okazaki (JP); Kunihiro Yamada, Okazaki (JP)

(73) Assignee: Aisan AW Co. Ltd., Anjo (JP)

(*) Notice: Subject to any disclaimer, the term of this patent is extended or adjusted under 35 U.S.C. 154(b) by 147 days.

(21) Appl. No.: 09/953,364

(22) Filed: Sep. 17, 2001

(65) Prior Publication Data

US 2003/0028318 A1 Feb. 6, 2003

(30) Foreign Application Priority Data

Oct. 2, 2000 (JP) ........................................ 2000-301740

(51) Int. Cl.[7] ............................................. G06F 165/00
(52) U.S. Cl. ........................ 701/209; 701/200; 701/201; 701/206; 701/210
(58) Field of Search ................................ 701/209, 200, 701/201, 206, 210; 340/990, 995; 73/178 R

(56) References Cited

U.S. PATENT DOCUMENTS

| | | | | |
|---|---|---|---|---|
| 5,513,110 A | * | 4/1996 | Fujita et al. | 701/207 |
| 5,899,955 A | * | 5/1999 | Yagyu et al. | 701/209 |
| 5,931,888 A | * | 8/1999 | Hiyokawa | 384/475 |
| 5,944,768 A | * | 8/1999 | Ito et al. | 701/200 |
| 5,978,732 A | | 11/1999 | Kakitani et al. | 701/209 |
| 6,038,507 A | | 3/2000 | Miyano | 701/202 |

FOREIGN PATENT DOCUMENTS

| | | |
|---|---|---|
| EP | 0 703 436 A2 | 3/1996 |
| EP | 0 751 376 A2 | 1/1997 |
| EP | 0 871 010 A2 | 10/1998 |
| JP | A 8-94371 | 4/1996 |

* cited by examiner

*Primary Examiner*—Thomac G. Black
*Assistant Examiner*—Arthur D. Donnelly
(74) *Attorney, Agent, or Firm*—Oliff & Berridge, PLC

(57) ABSTRACT

Disclosed is a navigation apparatus for a vehicle, which detects a present location of a mobile body, searches for a route to a destination based on map data and roads ranked in accordance with a degree of details of roads, and outputs information of the searched route. An optimal route from a present location to a destination is searched for using the map data every predetermined time or every predetermined distance. A storage medium incorporates a program that has the capabilities of the navigation apparatus.

30 Claims, 8 Drawing Sheets

LAYER 3

LAYER 2

LAYER 1

LAYER 1 : ALL ROAD DATA
LAYER 2 : TOLL EXPRESSWAYS, NATIONAL ROADS, PERFECTURAL ROADS
LAYER 3 : TOLL EXPRESSWAYS, NATIONAL ROADS

NAVIGATION APPARATUS AND STORAGE MEDIUM THEREFOR

BACKGROUND OF THE INVENTION

1. Field of Invention

The present invention relates to a navigation apparatus for a vehicle and a storage medium that search for a new route during a route guidance.

2. Description of Related Art

To quickly search for a route from a place of departure to a destination, navigation apparatuses of the related art have previously stored map data hierarchized according to the degree of details of roads from upper-rank main roads (such as expressways, superhighways, toll roads and national roads) to lower-rank ordinary roads, and searched routes near the place of departure and near the destination in lower-rank roads or searched routes from an intermediate point between the place of departure and the destination in upper-rank roads.

The route searching method of the related art performs route searching by considering only those roads in the vicinity of the place of departure and the destination. The method therefore searches only for upper-rank main roads stored at a midway point between the place of departure and the destination, though there may be lower-rank ordinary roads at the same midway point which are shorter routes to a destination. The methods of the related art may therefore guide one to a route having a longer way to the desired destination. Even in the case where there is a shorter way by an ordinary road, as indicated by a thin line in FIG. 9, for example, a longer national road, as indicated by a thick line in FIG. 9, is searched and guided as an optimal route according to the previous methods.

SUMMARY OF THE INVENTION

Accordingly, it is an object of the invention to prevent guidance of a longer route to a desired destination from a midway point between the place of departure and the destination by searching for a route using all road data, i.e., upper-rank and lower-rank road data, every predetermined time or every predetermined distance traveled.

According to the invention, there is provided a navigation apparatus for a vehicle that searches for a route to a destination and gives guidance, the navigation apparatus comprising a present-location detecting means for detecting a present location of a mobile body; an information storage means which holds information necessary for route searching including map data hierarchized, or layered, according to the degree of details of roads from upper-rank main roads to lower-rank ordinary roads; a route searching means that searches for a route based on present-location information detected by the present-location detecting means and the map data stored in the information storage means; an output means for outputting route information searched by the route searching means; and a control means for outputting the route information to the output means, whereby the route searching means searches for an optimal route from a present location to a destination based on the map data every predetermined time or every predetermined distance.

According to the invention, there is also provided a storage medium incorporating a program capable of detecting a present location of a mobile body; searching for a route to a destination based on map data hierarchized, or layered, according to the degree of details of roads from upper-rank roads to lower-rank roads; and outputting information of the searched route, whereby the program searches for an optimal route from a present location to a destination based on the map data every predetermined time or every predetermined distance.

DETAILED DESCRIPTION OF PREFERRED EMBODIMENT

A preferred embodiment of the invention will now be described with reference to the accompanying drawings.

Figure 1:
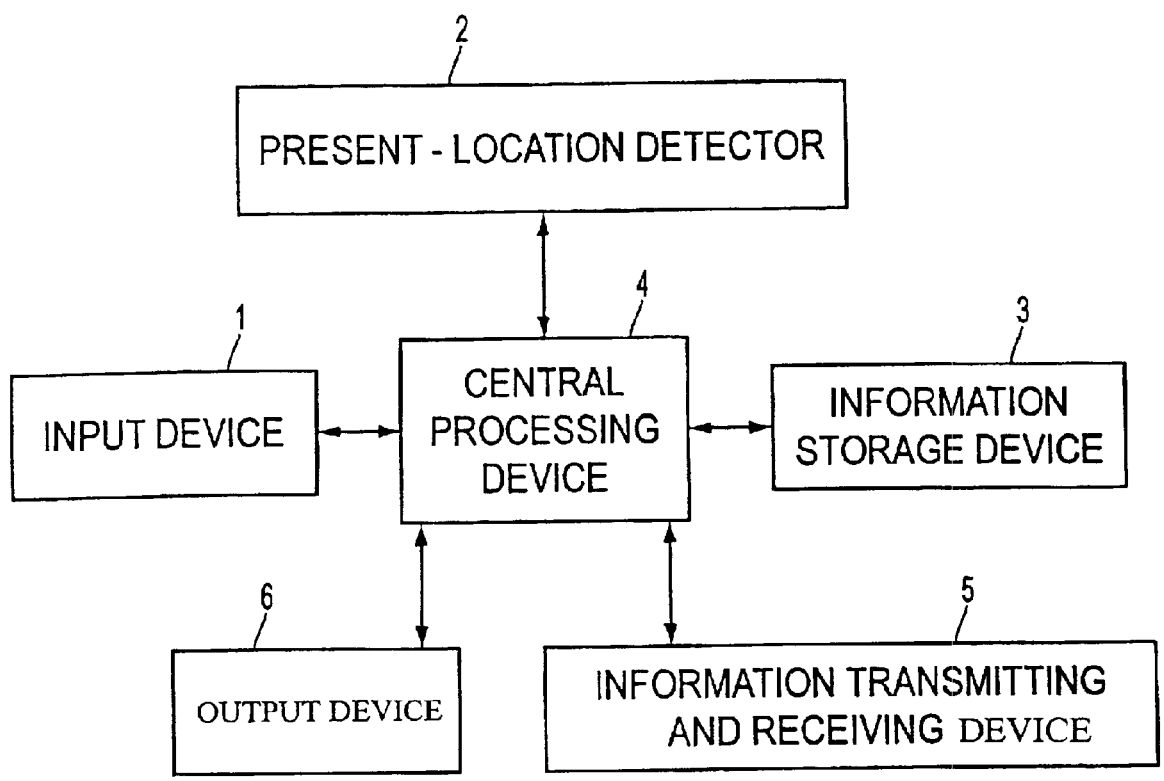
FIG. 1 is a diagram exemplifying the structure of a navigation apparatus for a vehicle according to the invention.

FIG. 1 is a diagram exemplifying the structure of a navigation apparatus for a vehicle according to the invention.

The navigation apparatus comprises an input device 1, a present-location detector 2, an information storage device 3, a central processing device 4, an information transmitting and receiving device 5 and an output device 6. The input device 1 receives information about a route guidance. The present-location detector 2 detects information about the present location of a local vehicle. Recorded in the information storage device 3 are navigation data needed to compute routes, display/voice guidance data needed to guide routes and programs (application and/or OS). The central processing device 4 performs the processing for route searching or the display/voice guidance processing, and the general control of the system. The information transmitting and receiving device 5 receives and transmits information about the running of the vehicle, such as road information and traffic information, detects information about the present location of the vehicle, and receives and transmits information about the present location of the vehicle. The output device 6 outputs information about a route guidance.

The input device 1 has capabilities of inputting a destination and instructing the central processing device 4 to perform a navigation process intended by a driver. The capabilities may be accomplished by using, for example, a remote controller, such as a touch switch or jog dial, which is operated to enter a destination by, for example, a telephone number or coordinates on a map and request a route guidance. The input device 1 also has a unit to ensure a voice-based interactive process and thus serves as a voice input device 1. The input device 1 may be additionally provided with a card reader which reads data recorded on an IC card or a magnetic card. The input device 1 may also be additionally provided with a data communications device that stores data necessary for navigation and exchanges data with information sources, such as an information center which provides information via a communication circuit in response to the driver's request and a portable electronic device which holds map data, destination data and data, such as simple maps and maps of the shapes of buildings.

The present-location detector 2 acquires present-location information of the vehicle using a global positioning system (GPS). The present-location detector 2 comprises sensors, such as an absolute bearing sensor which detects the bearing of the moving vehicle in terms of an absolute bearing using, for example, geomagnetism, or a relative bearing sensor which detects the bearing of the vehicle in terms of a relative bearing using, for example, a steering sensor or a gyro sensor, and a distance sensor which detects the running distance of the vehicle from, for example, the number of rotations of wheels.

Figure 5:
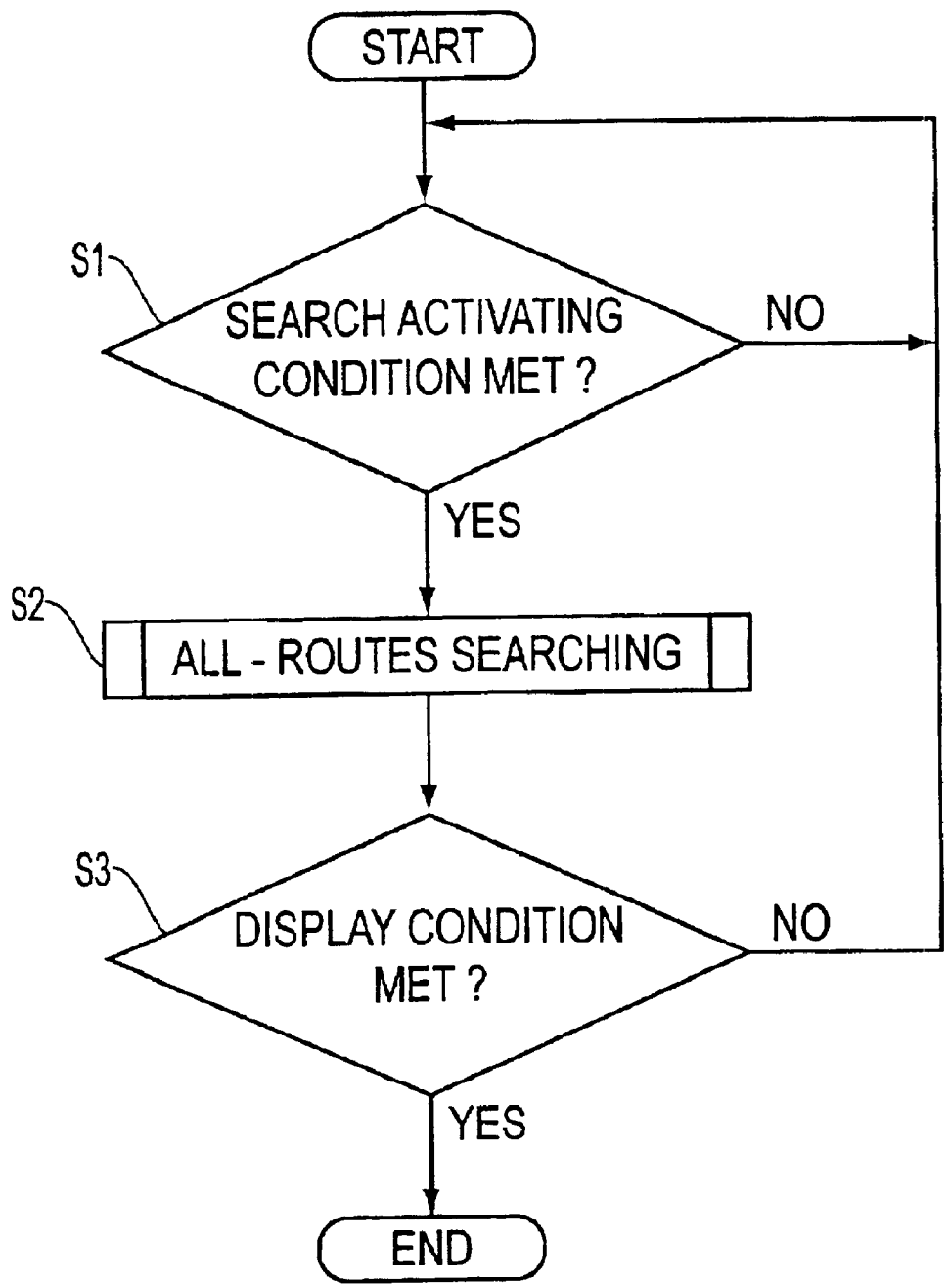
FIG. 5 is a diagram for explaining a route searching flow according to the invention.
Figure 6:
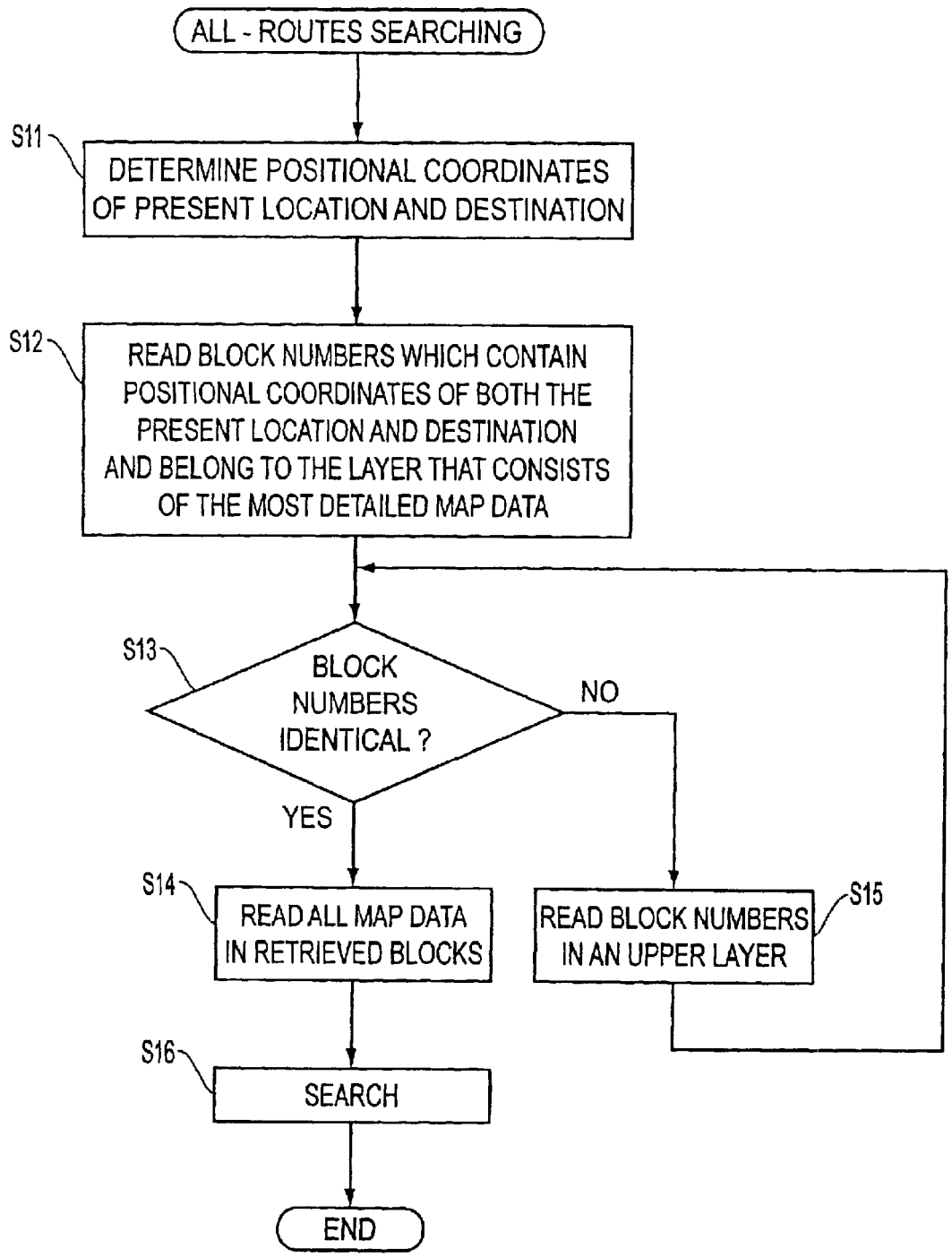
FIG. 6 is a diagram for explaining an all-routes searching routine.
Figure 7:
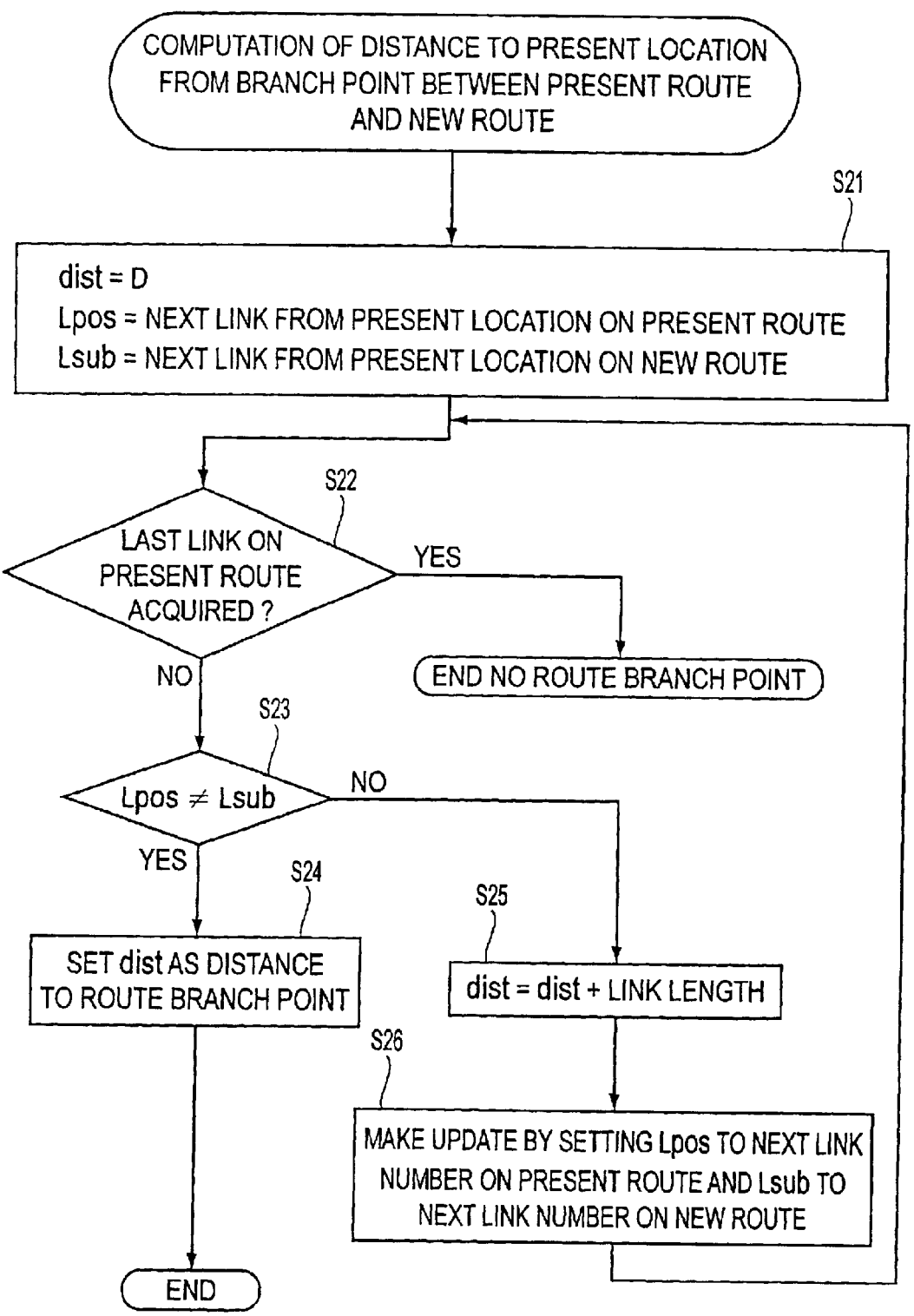
FIG. 7 is a diagram for explaining computation of a distance from a present location to a branch point.

The information storage device 3 is an external storage device, such as a CD-ROM or DVD-ROM, in which navigation programs and data are stored. The programs include, for example, a program for executing route searching as illustrated in FIGS. 5–7, a program for display output control necessary for route guidance and voice-based interactive guidance and data needed for the program, and a program for voice output control necessary for voice guidance and data needed for the program. The data stored includes files, such as map data hierarchized, or layered according to details of roads from upper-rank roads to lower-rank roads, map data to be displayed, guidance data, map matching data, destination data, data of registered locations, road data, genre-by-genre data, landmark data and calendar data, or all the data needed for the navigation apparatus. The invention may be adaptable to a type which stores data in a CD-ROM and stores programs in the central processing device 4.

The central processing device 4 comprises a CPU which performs various kinds of operations including a route searching process, output control of route guidance information and control for information to be output to the output device. The central processing device 4 further comprises a flash memory for loading a program from the CD-ROM of the information storage device 3 and storing it, a ROM where a program (program reading means) for performing program checking and updating of the flash memory, and a RAM which temporarily stores route guidance information to be searched, such as positional coordinates of a set destination and code numbers for road names, and data which undergoes an operation. The central processing device 4 further includes, though not illustrated, a speech processor which synthesizes speech, for example, a phrase, a sentence, sounds and the like, read from the information storage device 3, converts the synthesized data to an analog signal and outputs the analog signal to a loudspeaker based on a voice output control signal from the CPU. Further still, the central processing device 4 includes a communication interface which exchanges communication-oriented input and output data, a sensor input interface which acquires sensor signals from the present-location detector 2, and a clock which writes a date and hour in internal diagnose information. The program that executes the updating process may be stored in an external storage device.

All of the programs associated with the invention and other programs that execute navigation may be stored in the CD-ROM as an external storage medium. Alternatively, some or all of those programs may be stored in the ROM of the main body of the apparatus. As data and programs stored in the external storage medium are input as external signals to the central processing device 4 of the main body of the navigation apparatus are processed, various navigation functions are achieved.

As mentioned above, the navigation apparatus of the invention incorporates the flash memory having a relatively large capacity for loading a program from the CD-ROM of the external storage device and a small-capacity ROM where a program (program reading means) for starting up a CD is stored. The flash memory is a non-volatile memory device which retains stored information even when it is powered off. When starting up a CD, the program in the ROM, i.e., the program reading means, is activated and loaded into the flash memory to perform program checking, and disk management information is read from the CD-ROM of the information storage device 3. Program loading (updating) is then carried out based on this information and the results of determining the status of the flash memory.

The information transmitting and receiving unit 5 comprises a GPS receiver which acquires information, such as a present position, a date and an hour, using a GPS, a VICS (Vehicle Information and Communication System) information receiver which acquires traffic information using FM multiplex broadcasting, a radio beacon, an optical beacon or the like, cellular phones, personal computers, and the like and a data transmitter and receiver which makes bidirectional communications of information with an information center (e.g., ATIS (Advanced Traffic Information Service)) or another vehicle.

The output device 6 has capabilities of outputting guidance information by voice and/or on a screen when desired by the driver, and printing data processed for navigation in the central processing device 4. To achieve the capabilities, the output device 6 includes a display for displaying input data on the screen and displaying a route guidance screen, a printer for printing data processed in the central processing device 4 and data stored in the information storage device 3, and a loudspeaker for outputting a route guidance vocally.

The display is constructed by a simple liquid crystal display, and displays a screen of an enlarged figure of an intersection, a screen of an enlarged figure of a branch point, a present route in progress and a route newly searched all of which are based on map data and guidance data and are processed by the central processing device 4. The display therefore provides information about a destination in each route, the name of the destination, the time, the distance, arrows indicating the vehicle's bearing direction, and the image of an animated character. As image data sent to the display is binary image data (bit map data), a communication line which is used in serial communications or other communication lines may be used without using a special image signal line. The display has a memory for temporarily retaining bit map data.

The display is provided in an instrument panel located near the driver, so that when viewing the display, the driver can check the present location of the local vehicle or a future route. Though not illustrated, a tablet including a touch panel or a touch screen may be used for the display screen of the display, so that by touching the screen or tracking the screen, the driver can enter a position, a road or other data.

The following discusses the general system flow of the navigation apparatus of the invention. When programs are loaded into the central processing device 4 from the information storage device 3 and the route guiding program is activated, the present-location detector 2 detects the present location and a map around the present location is displayed along with the name of the present location. Then, a destination is set by using a target name, such as an area name or the name of a facility, a telephone number and an address, a registered point, or the name of a road. Route searching from the present location to the destination is then performed. When a route is determined, route guidance is made while tracking the present location using the present-location detector 2. Every time a predetermined time passes or a predetermined distance is covered, route searching is newly performed using road map data of an upper layer and a lower layer. When a new route better than the present route is found with respect to time and distance, then route guidance is switched to the new route automatically or by a manual instruction. When the new route is not better than the present route, on the other hand, then route guidance with the present location continues and similar route searching at predetermined time and distance intervals is repeated until the destination is reached.

The exemplary embodiment described newly performs route searching using all road data including upper-rank and lower-rank roads every predetermined time or every predetermined distance covered while the route searched after setting the destination is being guided, compares the new route with the current route to determine the better route in terms of the time and distance, and provides more detailed route guidance based on the results of the comparison. The details of the exemplary embodiment will be discussed below.

Figure 2A:
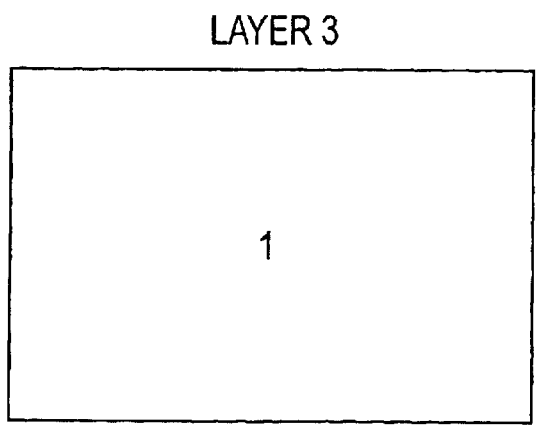
FIGS. 2a–2c are each a diagram for explaining the structure of map data.
Figure 2B:
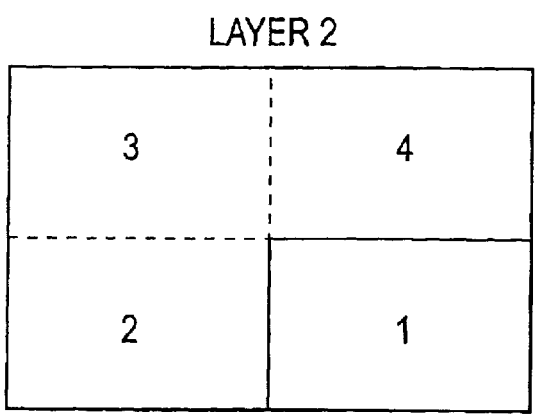
Figure 2C:
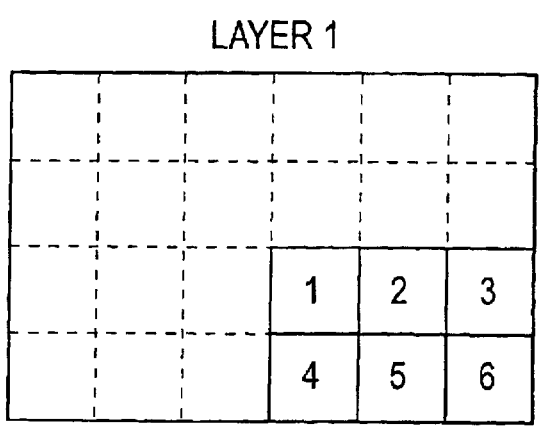

FIGS. 2a–2c are diagrams for explaining the structure of map data that is used in the invention.

Map data has a hierarchical, or layered, structure like that of layer 1, layer 2 and layer 3 as shown in FIGS. 2a–2c. Layer 1 is a first layer consisting of all the map data. Layer 2 is a second, or intermediate, layer consisting of, for example, toll expressways, national roads and prefectural roads. Layer 3 is a third layer consisting of, for example, only toll expressways and national roads. The higher the layer becomes, the rougher, or more general, the map data becomes because not as much information, or map data, regarding lower-ranked ordinary roads is provided. As route searching is conducted at a midway point between the place of departure and the destination based only on the upper-ranked main roads in the related art, a longer route may result in some cases. Therefore detailed route guidance is not performed sufficiently. The exemplary embodiment of the invention described herein executes route searching by searching map data in all of the first, second and third layers even at a midway point between the place of departure and the destination. As a result, a more detailed and more efficient route to a destination is achieved.

Figure 3:
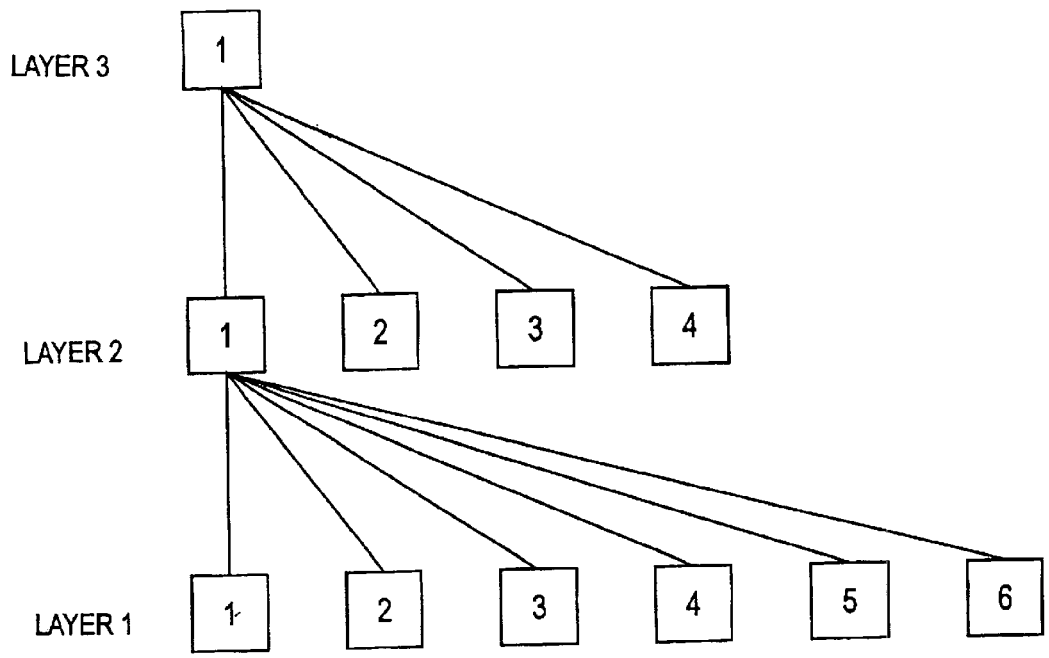
FIG. 3 is a diagram for explaining the structure of map data.

A block number or block numbers indicating an area or areas to which the road in question belongs is affixed to each layer. The block numbers in layer 1, the block numbers in layer 2 and the block number in layer 3 are stored in the information storage device 3 in association with one another as shown in FIG. 3. Specifically, in the example of FIG. 3, block number 1 in layer 3 includes block numbers 1 to 4 of layer 2, and block number 1 in layer 2 includes block numbers 1 to 6 of layer 1. When searching for a route using map data having the hierarchical, or layered, structure described, when the positional coordinates of the present location lie in the area of block number 1 of layer 1 and the positional coordinates of the destination lie in the area of block number 6 of layer 1, for example, all map data between the present location and the destination is read out as data of block number 1 of layer 2, and route searching is performed based on the map data. Likewise, when the positional coordinates of the present location lie in the area of block number 1 of layer 2 and the positional coordinates of the destination lie in the area of block number 2 of layer 2, data of block number 1 of layer 3 should be read out. Of course, when the positional coordinates of the present location and those of the destination lie in the area of the block number in the same layer, data of only that block number should be read out.

Figure 4:
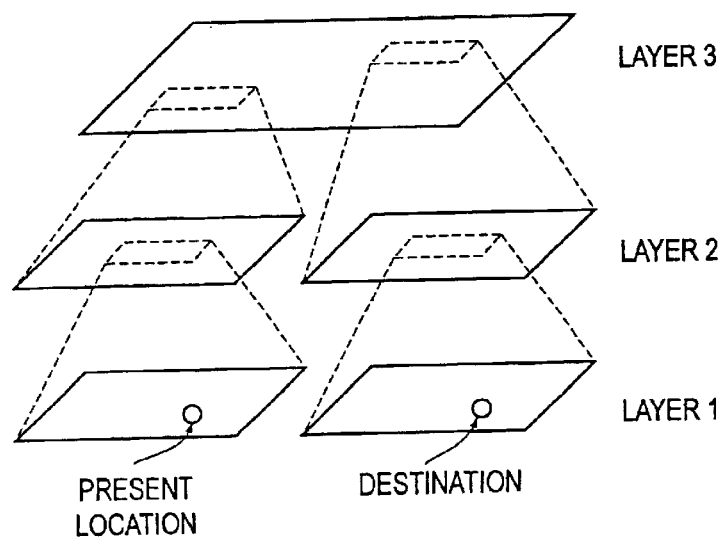
FIG. 4 is a diagram for explaining route searching based on map data having a hierarchical structure.

In other words, when each of the present location and the destination lies in the area of one block number of layer 1, as shown in FIG. 4, it is determined which block numbers in layer 2 those block numbers of layer 1 belong to. When the block numbers of the present location and the destination of layer 2 differ from each other, there is always the block number of layer 3 in which both block numbers are included. When the block number in which the positional coordinates of the present location and the destination are included is found, data of this block number should be read out so that route searching can be executed using all map data.

FIG. 5 is a diagram for explaining a route searching flow according to the invention in which an optimal route from the present location to the destination is newly searched for during route guidance when a predetermined condition is met.

Accordingly, it is determined whether or not the search activating condition has been met in step S1. The search activating condition in the exemplary embodiment described is at least one of condition A or condition B occurring in combination with condition C, where:

Condition A=2 km has been covered since the previous search;

Condition B=5 minutes or more have passed since the previous route searching; and Condition C=No guided intersection on the present route lies within 1 km.

The search activating condition is met therefore when condition A or condition B is satisfied and condition C is satisfied. Note that conditions A, B and C are merely illustrative, and are not intended to be restrictive. For example, conditions A and B may be changed automatically or manually in accordance with the characteristic of the present route, and the distance in condition C may be made shorter if the searching time becomes shorter. The search activating condition may be condition A alone, condition B alone, or may be some combination of conditions A, B and C, such as, for example, condition A and condition C occurring. That is, the search activating condition can be changed as needed. When the search activating condition is satisfied, an all-routes searching routine is performed in step S2. Thereafter, it is determined whether or not the display condition has been met in step S3.

The display condition is met in the exemplary embodiment described when condition D and condition E occur, where:

Condition D=The new route which makes the time required to reach the destination shorter than the present route or has a shorter driving distance than the present route; and Condition E=The distance from the present location to a route branch point (the point at which a new route branches from the present route) is within 2 km.

The display condition is satisfied when condition D and condition E are met. The time required to reach the destination is computed by dividing the distances of the roads that make the route, road type by road type, by associated average speeds that have been decided for the respective road types beforehand (e.g., 60 km/h for an expressway and 40 km/h for ordinary roads) and summing the divisional results. When traffic congestion needs to be considered, average speeds should have been determined beforehand in accordance with the degree of traffic congestion of each road type. The time required is then computed in accordance with the degree of traffic congestion and types of roads on the route. The average speeds may be predetermined or may be input by a user. Condition D may be replaced with such a condition that a new route differs from the present route rather than is shorter, by time or distance, than the present route. If neither of condition D or condition E are met, the flow then returns to step S1. When condition D and E are met, then searching is terminated and the new route is displayed on the screen. The reason for setting the distance from the present location to a route branch point to be 2 km or less is that it is unlikely at the present time for a user to need the guidance of a new route at a route branch point of more than 2 km ahead. Of course, it should be appreciated that the display condition may be set such that the occurrence of condition D alone or condition E alone may satisfy the requirement of the display condition.

When the display condition is one of condition D and condition E, it may be determined whether or not condition E is met after determining whether or not condition D is met. Alternatively, the determination order may be reversed. The following exemplary description is given in the case where condition E is checked first followed by the determination on condition D.

First, it is determined whether or not a route branch point lies within 2 km from the present location. When it is determined that the route branch point lies within 2 km from the present location, the time and distance to the desired destination using the new route and the present route are obtained and condition D is checked. That is, the determination of condition E is made before the determination of condition D. The determination of condition E is positive in this instance as a road, or route branch point, is at most 2 km from the present location. It is possible to determine that a route branch point does not lie within 2 km from the present location if link numbers, for example 10, 11, 100, 101, and 102 in FIG. 8, which form the new route and are located within 2 km from the present location, are compared with those link numbers 8, 9, 10, 11, 12, 13, and 14 which form the present route in FIG. 8 that are also located within 2 km from the present location because all the link numbers coincide. However, a route branch point lies within 2 km from the present location if there is an unmatched link number. Because the determination of condition D involves all the roads that form the route, it takes a longer time than the determination of condition E. In the case where the display condition requires condition D and condition E to occur to satisfy the display condition requirement, then the display condition is not met when either condition D or condition E is not satisfied. Therefore, the display condition of step S3 in FIG. 5 is determined most efficiently by determining whether condition E is positive first as that can be made faster.

Of course, condition E is just illustrative and may be varied automatically or manually by a user using a predetermined time (for example 5 minutes in the described embodiment) for the search activating condition as a parameter. Further, condition E may be changed based on the current vehicle speed or an old average vehicle speed obtained and the predetermined time for the search activating condition. Setting the display condition based on the vehicle speed and the predetermined time for the search activating condition can prevent a further search activating condition from being met and another new route from being displayed accordingly before the vehicle reaches a route branch point of a new route.

The computation of the distance from the present location to a route branch point (2 km in the aforementioned example) will be discussed with reference to FIGS. 7 and 8.

Figure 8:
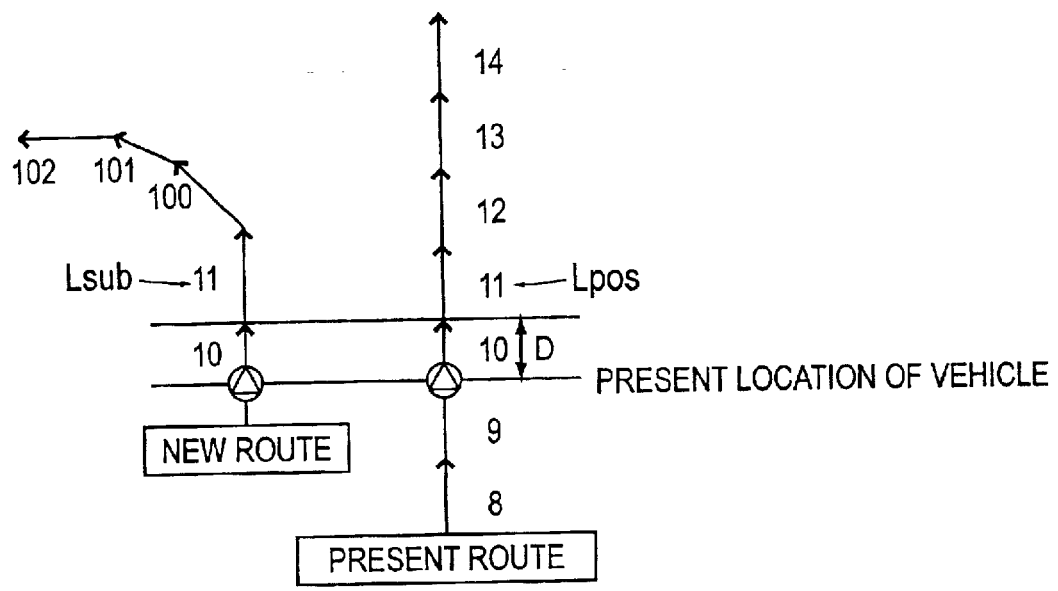
FIG. 8 is a diagram for explaining computation of a distance from a present location to a branch point.
Figure 9:
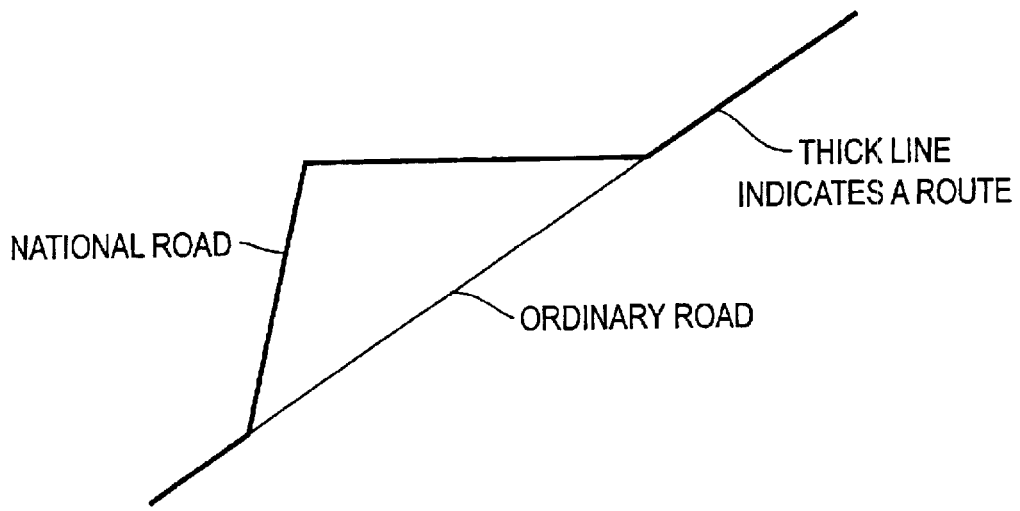
FIG. 9 is a diagram for explaining a searched route at a midway point between the place of departure and a destination.

In FIG. 8, numbers 8, 9, 10, 11, 12, 13 and 14 on the present route indicate link numbers that form the present route, and numbers 10, 11, 100, 101 and 102 indicate link numbers that form a new route. The present location of the vehicle lies on the link with number 10 for both the new route and the present route. D is the distance from the present location to the end of link number 10.

Referring to FIG. 7, dist=D, Lpos=next link from the present location (present location of the vehicle) on the present route and Lsub=next link from the present location (present location of the vehicle) on the new route. Lpos, Lsub and dist are set in step S21. Then it is determined whether the last link on the present route has been acquired, i.e., whether all the links to the destination have been acquired in step S22. When the last link on the present route has not been acquired yet, it is determined whether or not Lpos differs from Lsub in step S23. When Lpos and Lsub are identical, the route is not branched. Therefore dist is changed to dist=dist+link length in step S25, and an update is made by setting Lpos to the next link number on the present route and Lsub to the next link number on the new route in step S26. Then, the flow returns to step S22 to repeat the same sequence of processes. When Lpos differs from Lsub in step S23, this indicates the route is branched. Accordingly, dist is set as the distance to the route branch point in step S24. Through the above-described sequence of processes, the distance from the present location to the branch point can be computed.

A description will now be given of the flow of all-routes searching in step S2 of FIG. 5 with reference to the subroutine illustrated in FIG. 6.

First, the positional coordinates of both the present location and destination are determined in step S11. Then the block numbers which contain the positional coordinates of both the present location and destination and belong to the layer, for example layer 1 of FIGS. 2 and 3, that consists of the most detailed map data are read out in step S12. Then, it is determined whether or not the block numbers which contain the positional coordinates of the present location and destination are identical in step S13. If the block numbers are identical in step S13, then all the map data in the retrieved blocks is read out in step S14. If the block numbers differ from each other in step S13, on the other hand, then their associated block numbers in a next layer, for example, layer 2 or layer 3, are read out in step S15. Then the flow returns to step S13 to repeat the sequence of processes until the read block numbers become identical. Searching is carried out based on all the map data in the same retrieved block read out in the above manner in step S16. In the case of conducting route searching in consideration of traffic congestion, traffic information received by an information receiver, such as a VICS receiver, should be stored in memory and road data where a traffic is jammed should be read out to make the searching load heavier. This makes it more difficult to pick up a road where a traffic jam exists than a road where there is no traffic jam.

When a new route better than the present route is found, the guided route may be changed to the new route from the present route automatically or in response to a manual instruction by a user who makes the selection. Ways of making the selection include, for example, the user entering the command "Cancel" by voice or by operating a joystick or the like within a predetermined time. Once such a selection has been entered, the guidance of the present route resumes. However, when no input selection is made or entered within the predetermined time, then it is determined that the user intends to change the route and the new route will be guided. In selecting a route, the user wants route information so that the user may determine whether the new route is shorter than the present route or requires less time than the present route as displayed on the screen. In the case of making the display, information on the differences between both routes (XX m shorter, or YY minutes quicker) is displayed. Further, the position of the new route and the advantages of the new route over the present route can be grasped at the same time by displaying the new route and the present route simultaneously in different colors and showing the color of the new route next to the information on the differences between the present route and the new route.

The map data structure and searching method of the invention are not limited to those of the exemplary embodiment described above. Rather the invention is applicable to various kinds of route searching which use map data that is stored in a layered, hierarchical, structure in accordance with the degree of details of the maps.

In the exemplary embodiment described, the map data of layer 3 should contain maps that include both the present location and a destination. This system makes layer 3 hold a considerably wide range of map data, thus lowering the searching efficiency. As a solution to this shortcoming, layer 3 may be designed and stored as to consist of maps of plural blocks. When the most general map is stored in the form of plural blocks, it may occur that layer 3 does not contain the map of the block that includes the present location and the destination. To avoid this problem, with respect to the block number in a layer lower than the highest layer by one rank, related information that suggests the use of an X-th block in the highest layer for a Y-th block and Z-th block and the highest layer are stored. When the present location and the destination do not lie in the same block in the highest layer, the associated map in the highest block may be read out for route searching based on the related information of those two blocks.

The method of computing the distance to a route branch point according to the invention is not limited to the above-described method of the exemplary embodiment described. Rather, it should be appreciated that various other methods may be adaptable. For example, it is determined that a new route branches from the present route when it is determined that the present route and the new route have the same or different links in the exemplary embodiment described. This method is premised on the present route and a new route being constructed by map data of layers having the same degree of details and the links of both routes are the same or similar lengths. The following describes a method of computing the distance to a route branch point when the degree of details of the present route differs from degree of details of a new route and the links of both routes differ from each other.

Figure 10:
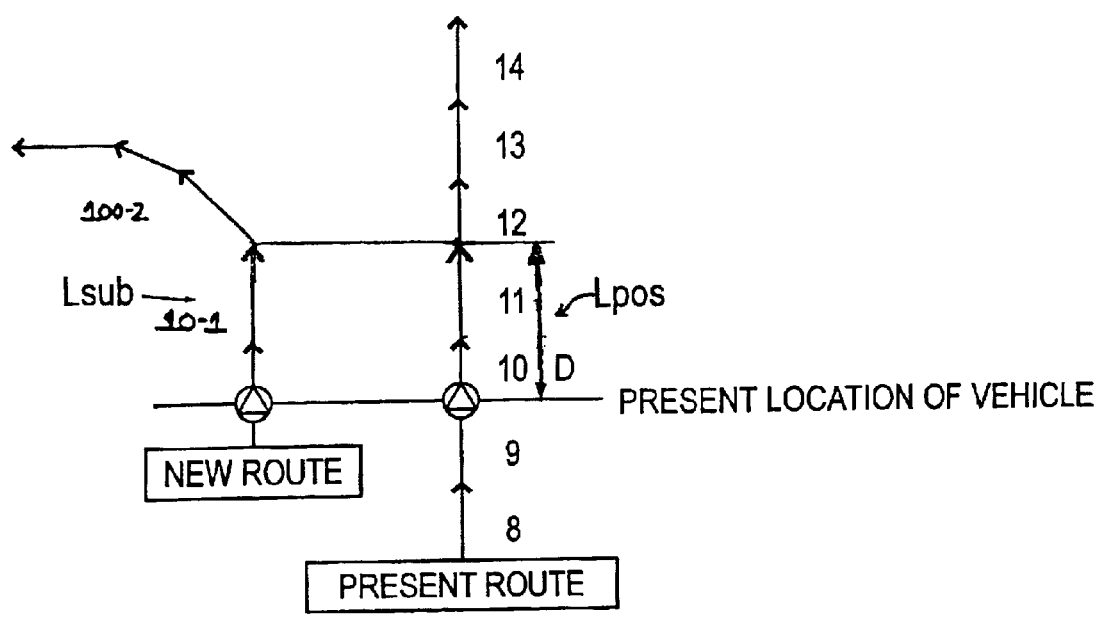
FIG. 10 is a diagram explaining computation of a distance from a present location to a branch point according to another exemplary embodiment of the invention.

In FIG. 10, when a new route is formed by two links with link numbers 10-1 and 100-2 (it is assumed that the layer of the new route is general, i.e., does not have high map data detail) and the present route is formed by five links with link numbers 10 to 14. The link number 10-1 of the new route is identified as consisting of link numbers 10 and 11, so that it is determined that the link number 10-1 of the new route is identical to the link numbers 10 and 11 of the present route. Likewise, it is determined that the link number 100-2 of the new route is identical to what were the link numbers 100, 101 and 102 of FIG. 8. Therefore, the link number 100-2 of the new route in FIG. 10 is quite different from the link number 12 of the present route in FIG. 10. That is, it is determined that the link number 100-2 does not include the link number 12. It is therefore determined that the route branch point is a point where the link numbers 11 and 12 are linked. The distance to the route branch point can be calculated as shown in FIG. 10 based on the length of the link to the route branch point and information on the present location similar to the manner in which the distance is calculated in FIGS. 7 and 8.

In short, the invention has the following advantages.
(1) As route searching is performed every predetermined time and every predetermined distance by using map data which is hierarchized in accordance with the degree of details of roads, guidance of a longer route is prevented and more detailed guidance can be given.
(2) As route searching is carried out in consideration of traffic congestion, guidance of a route that requires a longer time can be prevented.
(3) It is possible to prevent guidance of a route which is not better than the present route.
(4) It is possible to change a guided route to a new route which is better than the present route.

Although only two exemplary embodiments of the invention have been described herein, it should be apparent to those skilled in the art that the invention may be embodied in many other forms without departing from the spirit or scope of the invention. Therefore, the present examples and exemplary embodiments described are to be considered as illustrative and not restrictive and the invention is not to be limited to the details given herein, but may be modified within the scope of the appended claims.

What is claimed is:

1. A navigation system for searching for a route to a destination, comprising:
    a present-location detector which detects a present location;
    a memory which holds information necessary for route searching including map data hierarchized in accordance with a degree of details of roads;
    an output interface which outputs route information; and
    a controller which searches for a route based on present-location information detected by the present-location detector and the map data and outputs the route information to the output interface,
    wherein the controller newly searches for an optimal route from a present location to the destination based on the map data every predetermined time or every predetermined distance.

2. The navigation system according to claim 1, wherein the controller outputs both information of a newly searched route and information of a present route to the output interface.

3. The navigation system according to claim 1, wherein the controller compares a newly searched route with a present route and outputs information of the newly searched route to the output interface if a travel time for the newly searched route or a travel distance of the newly searched route is smaller than a travel time for the present route or a travel distance of the present route.

4. The navigation system according to claim 1, wherein the controller compares a newly searched route with a present route, and changes a guided route to the newly searched route and outputs information of the newly searched route to the output interface automatically or based on a manual instruction if a travel time for the newly searched route or a travel distance of the newly searched route is smaller than a travel time for the present route or a travel distance of the present route.

5. The navigation system according to claim 1, wherein the controller outputs information of a difference between a newly searched route and a present route to the output interface.

6. The navigation system according to claim 2, wherein the controller outputs information of a difference between the newly searched route and the present route to the output interface.

7. The navigation system according to claim 3, wherein the controller outputs information of a difference between the newly searched route and the present route to the output interface.

8. The navigation system according to claim 4, wherein the controller outputs information of a difference between the newly searched route and the present route to the output interface.

9. The navigation system according to claim 1, wherein the controller computes a distance from a present location detected by the present-location detector to a route branch point at which a newly searched route branches from a present route, and outputs information of the newly searched route to the output interface if the distance is smaller than a predetermined value.

10. The navigation system according to claim 2, wherein the controller computes a distance from a present location detected by the present-location detector to a route branch point at which a newly searched route branches from a present route, and outputs information of the newly searched route to the output interface if the distance is smaller than a predetermined value.

11. The navigation system according to claim 3, wherein the controller computes a distance from a present location detected by the present-location detector to a route branch point at which a newly searched route branches from a present route, and outputs information of the newly searched route to the output interface if the distance is smaller than a predetermined value.

12. The navigation system according to claim 4, wherein the controller computes a distance from a present location detected by the present-location detector to a route branch point at which a newly searched route branches from a present route, and outputs information of the newly searched route to the output interface if the distance is smaller than a predetermined value.

13. The navigation system according to claim 5, wherein the controller computes a distance from a present location detected by the present-location detector to a route branch point at which a newly searched route branches from a present route, and outputs information of the newly searched route to the output interface if the distance is smaller than a predetermined value.

14. The navigation system according to claim 1, wherein the controller newly searches for an optimal route from the present location to the destination based on the map data every predetermined time.

15. The navigation system according to claim 1, wherein the controller newly searches for an optimal route from the present location to the destination based on the map every predetermined distance.

16. A navigation system for searching a route to a destination, comprising:

a present-location detector which detects a present location;

a memory which holds information necessary for route searching including map data hierarchized in accordance with a degree of details of roads;

an output interface which outputs route information;

a controller which newly searches a route based on present-location information detected by the present-location detector and the map data every predetermined time or every predetermined distance and outputting the route information to the output interface; and an input interface which selects a route, wherein the controller outputs both a presently guided route and a newly searched route to the output interface when the newly searched route is different from the presently guided route, and guides based on a route selected by the input interface.

17. A method for searching a route from a present location to a destination comprising:

determining the present location;

searching for a route to the destination based on map data hierarchized in accordance with a degree of details of roads; and outputting information of the searched route, wherein an optimal route from a present location to the destination is newly searched every predetermined time or every predetermined distance.

18. The method according to claim 17, further comprising outputting both information of a newly searched route and information of a present route.

19. The method according to claim 17, further comprising:

comparing a newly searched route with a present route; and if a travel time of the newly searched route is less than a travel time of a present route or a travel distance of the newly searched route is less than a travel distance of the present route, outputting information of the newly searched route.

20. The method according to claim 17, further comprising:

comparing a newly searched route with a present route; and if a travel time of the newly searched route is less than a travel time of a present route or a travel distance of the newly searched route is less than a travel distance of the present route, changing the newly searched route to a guided route either automatically or in response to a manual instruction; and outputting information of the guided route.

21. The method according to claim 17, further comprising outputting information of a difference between a newly searched route and a present route.

22. The method according to claim 17, further comprising:

determining whether a distance from a present location to a route branch point at which the newly searched route branches from the output route is less than a predetermined value;

if the distance from the present location to the route branch point is smaller than the predetermined value, determining whether either a travel time or travel distance of the newly searched route is respectively less than a travel time or travel distance of the output route; and if the travel time of the newly searched route is less than the travel time of the output route or the travel distance of the newly searched route is less than the travel distance of the output route, outputting the newly searched route.

23. The method according to claim 17, wherein the optimal route from a present location to the destination is newly searched every predetermined time.

24. The method according to claim 17, wherein the optimal route from a present location to the destination is newly searched every predetermined distance.

25. The method of claim 18, further comprising:
   selecting a route for guidance; and
   guiding based on the selected route.

26. The method according to claim 17, embodied in a set of instructions, the instructions comprising a program embedded in a storage medium.

27. A navigation system for searching for a route to a destination, comprising:
   a present-location detecting means for detecting a present location;
   an information storage means for holding information necessary for route searching including map data hierarchized in accordance with a degree of details of roads;
   a route searching means for searching for a route based on present-location information detected by the present-location detecting means and the map data hierarchized in accordance with the degree of details of roads and stored in the information storage means;
   an output means for outputting route information; and
   a control means for outputting the route information to the output means,
   wherein the route searching means newly searches for an optimal route from a present location to the destination based on the map data every predetermined time or every predetermined distance.

28. The navigation system according to claim 27, wherein the route searching means newly searches for an optimal route from the present location to the destination based on the map data every predetermined time.

29. The navigation system according to claim 27, wherein the route searching means newly searches for an optimal route from the present location to the destination based on the map every predetermined distance.

30. A navigation system for searching a route to a destination, comprising:
   a present-location detecting means for detecting a present location;
   a storage means which holds information necessary for route searching including map data hierarchized in accordance with a degree of details of roads;
   an output means for outputting route information;
   a route searching means for newly searching a route based on present-location information detected by the present-location detecting means and the map data every predetermined time or every predetermined distance; and
   an input means for selecting a route,
   wherein the output means outputs both a presently guided route and a newly searched route when the newly searched route is different from the presently guided route, and guides based on a route selected by the input means.

* * * * *

UNITED STATES PATENT AND TRADEMARK OFFICE
CERTIFICATE OF CORRECTION

PATENT NO. : 6,795,769 B2  
APPLICATION NO. : 09/953364  
DATED : September 21, 2004  
INVENTOR(S) : Takanori Kaji, Noboru Ishibashi and Kunihiro Yamada It is certified that error appears in the above-identified patent and that said Letters Patent is hereby corrected as shown below:

On the Title page, item (73) Assignee:
 change: "Aisan AW Co. Ltd., Anjo (JP)"
 to: --Aisin AW Co. Ltd., Anjo (JP)"--

Signed and Sealed this

Twelfth Day of June, 2007

JON W. DUDAS
*Director of the United States Patent and Trademark Office*